Sept. 1, 1936. H. R. SNOW 2,053,209
METHOD OF TREATING HYDROCARBON OIL
Filed July 25, 1933
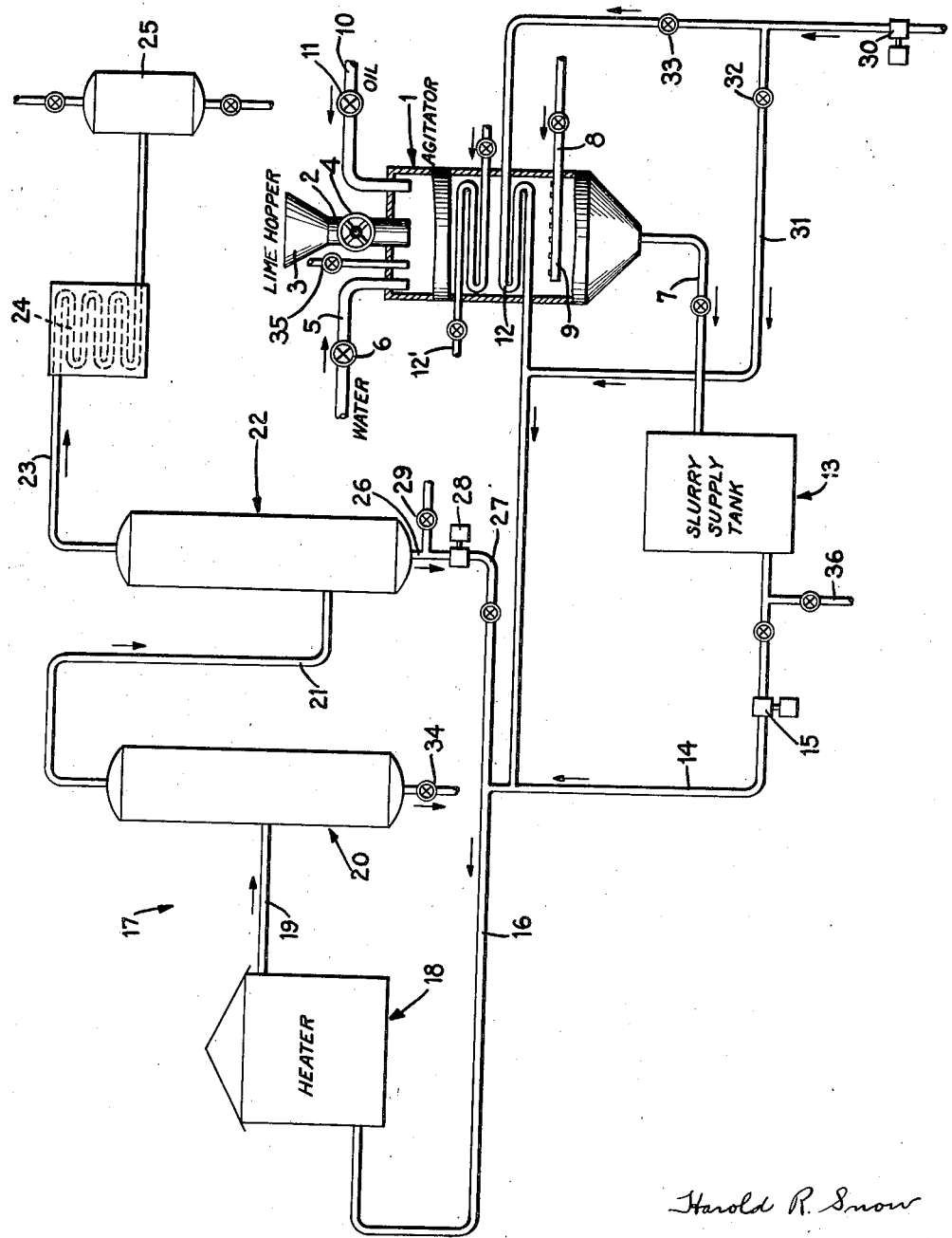
Harold R. Snow
INVENTOR
BY Benjamin B. Schneider
ATTORNEY Patented Sept. 1, 1936

2,053,209

UNITED STATES PATENT OFFICE 2,053,209

METHOD OF TREATING HYDROCARBON OIL

Harold R. Snow, Neodesha, Kans., assignor to Standard Oil Company, (Indiana), Chicago, Ill., a corporation of Indiana Application July 25, 1933, Serial No. 682,045

9 Claims. (Cl. 196—55)

This invention relates to methods for forming slurries of lime in oil, particularly in hydrocarbon oil which is to be subjected to distillation or cracking.

It has been proposed heretofore to mix powdered calcium hydroxide, commonly called hydrated lime, with hydrocarbon oil which is to be cracked to form lighter products. The suggestion has also been made, to add to the hydrated lime-oil slurry, mixture or suspension, a quantity of water to cause stabilization of the suspension and retard the settling out of the hydrated lime from the oil. The hydrated lime has been added to oil which is to be distilled and/or cracked, with the intention of neutralizing any acids present, thereby to reduce corrosion of the distilling or cracking equipment, and also to aid in the filtering of any tar formed in the process.

It is an object of my invention to provide an improved process for the production of a slurry of hydrated lime in oil, whereby the slurry will be rendered more stable with respect to settling.

A further object of my invention is to provide a process whereby a slurry may be formed of calcium oxide, commonly called quicklime, oil, and water, the quicklime being hydrated in the presence of the oil.

In accordance with my invention quicklime and water are mixed with a quantity of oil, the quicklime and water preferably being brought together in the presence of the oil at such a low rate as to insure that the temperature of the mixture shall not rise above the boiling point of the water, as a result of the heating attending the hydration of the quicklime. Or the quicklime and water may be brought into contact with one another in the presence of the oil in larger quantities than that which would result in the desired low temperature and positive cooling may be supplied to counteract the excessive heating. While the quicklime may be added to the oil first and be thoroughly agitated, and then the water added subsequently, I prefer first to mix oil and water and then to add the quicklime slowly to the mixture while providing agitation. I find that this latter method produces a more stable slurry, that is, a slurry in which there is less tendency for the resulting hydrated quicklime to settle out of the mixture or suspension. When using this latter method I find it preferable to add to the oil, water and quicklime in relatively small quantities alternatively. For example, at first only part of the water necessary completely to hydrate the quicklime is mixed with the oil, then a portion of the quicklime is added, followed by the rest of the water necessary, and finally the remaining quicklime necessary to supply the total amount needed. In a specific instance one-half of the water necessary may be mixed with the oil, and then about one-third of the quicklime, followed by the other one-half of the water and the rest of the quicklime in the order mentioned. The quicklime may be employed in any degree of fineness, but I prefer to use it in very fine form, for example sufficiently fine to pass through a 200 mesh sieve, air floated quicklime being particularly suitable.

By utilizing this process several advantages are obtained, one being that the slurry formed is much more stable than that which it is possible to obtain according to known processes, when using previously hydrated lime to form the mixture. I have found that a slurry made by hydrating quicklime while in mixture with the oil, the quicklime being first mixed with the oil and the water later added, produces a slurry more stable than that formed by the admixture with the oil of previously hydrated lime and water, but that the slurry made by first mixing water with the oil and then adding the quicklime is even more stable and desirable.

The above mentioned and further objects and advantages of my invention, and the manner of attaining them will be more fully explained in the following description taken in conjunction with the accompanying drawing.

The drawing is a diagrammatical view of an oil treating system embodying my invention. Referring more particularly to the drawing, reference numeral 1 indicates a tank or chamber, having leading thereinto a pipe 2, which connects to lime-hopper 3. This pipe has therein a control valve 4. The tank 1 also has a water inlet pipe 5, equipped with valve 6, a valved draw-off pipe 7, a valved agitating fluid inlet line 8, which connects with a distributing manifold 9 located inside of the tank, and a vent line 35. Reference numeral 10 indicates an oil charging line for the tank 1 having a valve 11 therein, and 12 indicates a cooling coil.

In operation any oil which it is desired to treat, such as gas oil for example, is introduced into the tank 1, through line 10, in the desired quantities. Water is then admitted through pipe 5, and the mixture is thoroughly agitated by the admission under pressure of fixed gases, e. g., those resulting from cracking hydrocarbon oil, air, steam, or other suitable fluid through pipe 8, or in any other desired manner. Following this, quicklime from the hopper 3 is passed through pipe 2 into the tank 1, at a relatively low rate of flow, which is controlled by valve 4. The admission of this quicklime is preferably carried on at such a low rate that the temperature of the mixture in the tank 1 does not rise, due to the heat of hydration of the quicklime, to a value great enough to vaporize any considerable portion of the water. Preferably, this temperature is prevented from exceeding a value of about 185° F. The rate of addition of the quicklime to the mixture may be increased, however, if at the same time a cooling fluid is passed through the indirect cooling coil 12 located inside of the tank, the cooling so supplied then serving to counteract the heat liberated as a result of hydration.

In carrying out this process I prefer first to add to the oil in the tank only a portion of the amount of water known to be necessary for the hydration of the quantity of quicklime to be added. This may be, for example, one-half of the water necessary. Then all or part of the total quantity of quicklime desired for the final mixture is added; preferably however, only a portion of the total amount of quicklime is added e. g. one-third thereof. Next an additional amount of water is introduced into the mixture, this amount preferably being the rest of the water necessary to make up the total amount, and finally any remaining quicklime is added. During all of these steps the mixture is preferably agitated in order to insure mingling of the several components, and the rate of commingling of the quicklime and water is kept relatively low to prevent overheating, or sufficient cooling is provided by coil 12 to maintain the desired low temperature. When steam is used as an agitating medium it will also aid in hydrating the quicklime, thereby serving as a source of water supply.

The lime-oil slurry formed may be withdrawn through line 7, to slurry supply tank 13, which provides additional reaction time for the slurry, and insures complete hydration of the lime; if such action is not fully obtained in the agitator 1.

The completely formed slurry may be withdrawn from tank 13, for any desired use. For example it may be forced through line 14, under pressure of pump 15, into line 16, in mixture with any desired quantities of charging oil, and thence to a cracking unit of any conventional design, indicated generally by reference numeral 17. The mixture of slurry and charging oil passes through cracking heater 18, wherein the mixture is raised to a cracking temperature, and thence through transfer line 19 into still 20, wherein separation of liquids from vapors takes place. The vapors travel through vapor line 21 into fractionator 22, wherein desired relatively light products, such as gasoline, are separated as vapors, which pass off through pipe 23 and condenser 24 into receiver 25. Undesirably heavy fractions are collected in the fractionator as reflux condensate, and may be withdrawn therefrom through line 26, either for recycling through conduit 27, by action of pump 28 or for diversion from the process through pipe 29. The liquid residue or tar separated in chamber 20 may be withdrawn through line 34, for filtering or any desired treatment.

The fresh charge for the cracking process, which may be gas oil or any other conventional charging stock, may be forced through heat exchange coil 12, to cool the slurry and thereby counteract the heat of hydration of the lime to the desired degree, while at the same time being itself preheated, or may be directed wholly or in part through bypass pipe 31, into line 16. Valves 32 and 33 provide the necessary control. Alternatively all or part of the cooling may be effected by passing other cooling fluid, such as water, through heat exchange coil 12'. If desired, the slurry may be so prepared in the agitator as to have the proper consistency for cracking without the addition of charging stock thereto. Reference numeral 36 indicates a drawoff line by which slurry may be diverted from the process.

In practical operation the amount of lime to be suspended in the oil may vary considerably depending upon the use to which the oil lime slurry is to be put. I find that where the slurry is to be used for admixture with other hydrocarbon oils for cracking in the usual manner, one and three-fourths to two pounds of quicklime may be added per gallon of oil, although a greater or lesser amount may be used if desired. The amount of water used is preferably somewhat in excess of that actually necessary to accomplish the hydration of the quicklime. The total amount of water added, may be, for example, about 9% or more by volume, of the oil.

A successful practical operation was conducted in the following manner:

First 4050 gallons of 24° A. P. I. gravity, distillate from cracked tar were pumped into the mixing tank, and 190 gallons of water were added. After agitation of the water and oil air-floated quicklime was added slowly in order that the temperature be kept below 185° F., 250 pounds of quicklime being thus added. Next 190 gallons more of water was supplied, this making the total amount of water added. The mixture was then agitated and subsequently thereto more quicklime was added until a total of 7400 pounds was mixed into the batch. The maximum temperature reached was 183° F., and the time consumed in making this batch was approximately 40 hours. A titration test showed the content of $Ca(OH)_2$, by weight, to be 21.6%.

A settling test carried out on this mixture indicated that at the end of one hour but 2% of clear oil separated from the slurry, and at the end of three hours only 4% of clear oil had separated from the slurry.

A slurry formed in accordance with the preceding description may be used for any desired purpose and is particularly useful in the cracking of hydrocarbon oil, the slurry being mixed with the oil to be cracked, prior to the passage thereof through the cracking zone, in sufficient quantities to prevent corrosion of the apparatus and to exercise other beneficial effects in a manner well known to those skilled in the art. The amount of hydrated lime in the final mixture of slurry and oil to be cracked may be, for example, about one pound to each fifty gallons of oil, although greater or lesser amounts may be used depending on the corrosive character of the oil to be cracked. Because of the stability of the lime oil suspension forming the slurry, the slurry may be made in somewhat larger quantities than necessary for immediate consumption and be stored for a period of time without danger of deleterious changes in its character.

While I have described a particular embodiment of my invention for the purpose of illustration, it should be understood that various modifications and adaptations thereof, occurring to one skilled in the art, may be made within the spirit of the invention as set forth in the appended claims.

I claim:

1. A method of making a lime in oil slurry which comprises first mixing water with a hydrocarbon oil to form a uniform mixture, then adding to said mixture finely divided quicklime to be hydrated by said water in the presence of said oil.

2. A process in accordance with claim 1 wherein the amount of quicklime so added is insufficient to utilize all of said water in completing hydration of said quicklime.

3. A process according to claim 1 wherein during the addition of the quicklime to the oil and water mixture, a cooling medium is brought into heat exchange relation with said mixture, to prevent the temperature thereof from rising due to the heat of hydration, sufficiently to cause any considerable loss of said water by vaporization.

4. A process according to claim 1 wherein during the addition of the quicklime the temperature of the mixture is prevented from exceeding a value of about 210° F.

5. A process according to claim 1 wherein during the addition of the quicklime the temperature of the mixture is held at a top value of about 180° F.

6. The process of forming a slurry of oil and lime which comprises mixing with said oil a quantity of water less than that necessary completely to hydrate the quicklime which is to be added, then adding to the mixture approximately one-third of the necessary quicklime, in air-floated form, then adding the remainder of the water necessary and finally admixing the remainder of the quicklime, in air-floated form, and during the process agitating the oil mixture and preventing the temperature thereof from exceeding a value of about 185° F.

7. A method of increasing the stability of a lime in oil slurry which comprises mixing water with hydrocarbon oil and subsequently adding quicklime in an amount sufficient to be completely hydrated by the water added.

8. A method of making a slurry of lime and petroleum oil as a final product of the process which consists in mixing water and quicklime with petroleum oil in a common zone, maintaining said zone at a temperature which will avoid distillation of the materials being admixed therein, the amount of water being in excess of that necessary to hydrate the quicklime while in mixture with the oil and withdrawing said slurry from said zone.

9. The process of forming a slurry of lime in petroleum oil as an end product of the process which consists in mixing quicklime, water and petroleum oil in a mixing zone, maintaining said zone at a temperature which will avoid distillation of the material being mixed therein, so that the hydration of the quicklime is accomplished while in direct contact with the petroleum oil and withdrawing said slurry from said zone as a product of the process.

HAROLD R. SNOW.